United States Patent

[11] 3,600,664

| [72] | Inventors | Leon J. Goldberg; |
| | | Francois D. Martzloff, both of Schenectady, N.Y. |
| [21] | Appl. No. | 4,246 |
| [22] | Filed | Jan. 20, 1970 |
| [45] | Patented | Aug. 17, 1971 |
| [73] | Assignee | General Electric Company |

[54] OVERCURRENT PROTECTION FOR SOLID-STATE VOLTAGE REGULATOR
9 Claims, 9 Drawing Figs.

| [52] | U.S. Cl. | 323/9, 323/43.5 S, 323/45, 323/62 |
| [51] | Int. Cl. | G05f 1/20, G05f 1/30 |
| [50] | Field of Search | 317/16, 33, 33 SC; 321/14; 323/9, 43.5, 45, 57, 62 |

[56] References Cited
UNITED STATES PATENTS

| 3,281,652 | 10/1966 | Perrins | 323/43.5 X |
| 3,461,378 | 8/1969 | King | 323/45 X |
| 3,495,129 | 2/1970 | Donner et al. | 323/43.5 X |
| 3,514,688 | 5/1970 | Martin | 323/43.5 X |

*Primary Examiner*—J. D. Miller
*Assistant Examiner*—A. D. Pellinen
*Attorneys*—John F. Ahern, Paul A. Frank, Julius J. Zaskalicky, Donald R. Campbell, Frank L. Neuhauser, Oscar B. Waddell and Joseph B. Forman ABSTRACT: A solid-state voltage regulator constructed with low current rating step changing solid-state switches, or pairs of switches, is protected against overcurrents in the interval before the opening of a slow-acting circuit breaker. The overcurrent is transferred from one switch to another in sequence rapidly to take advantage of the short time current overcapacity, or is diverted to a shunting protective switch which can have other functions. Alternatively, one switch has a high current rating, and the overcurrent is diverted to the heavy-duty switch.

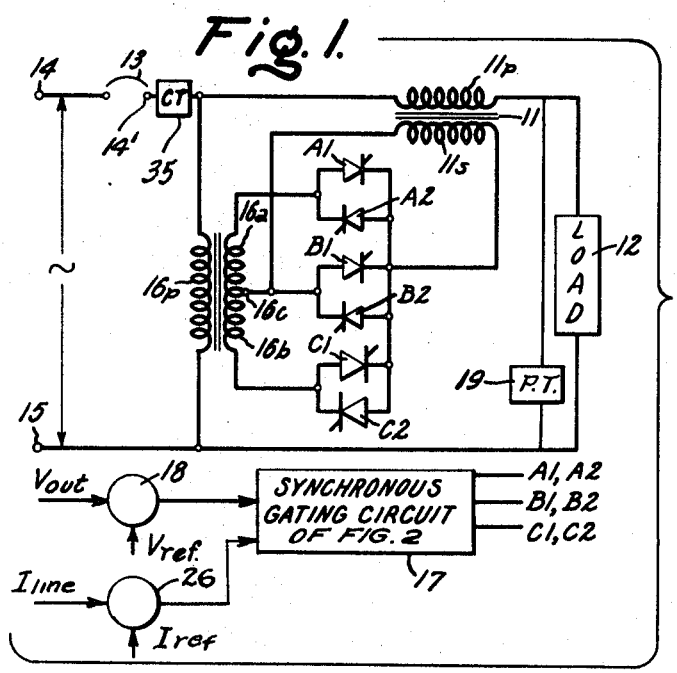

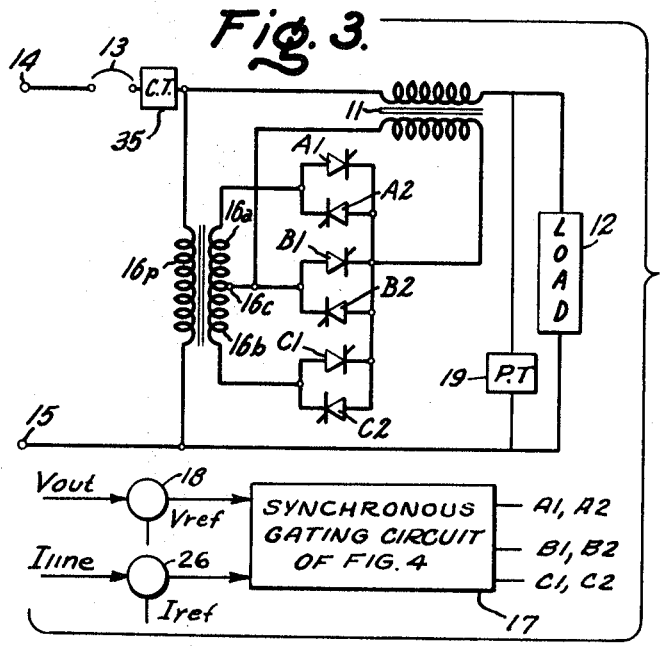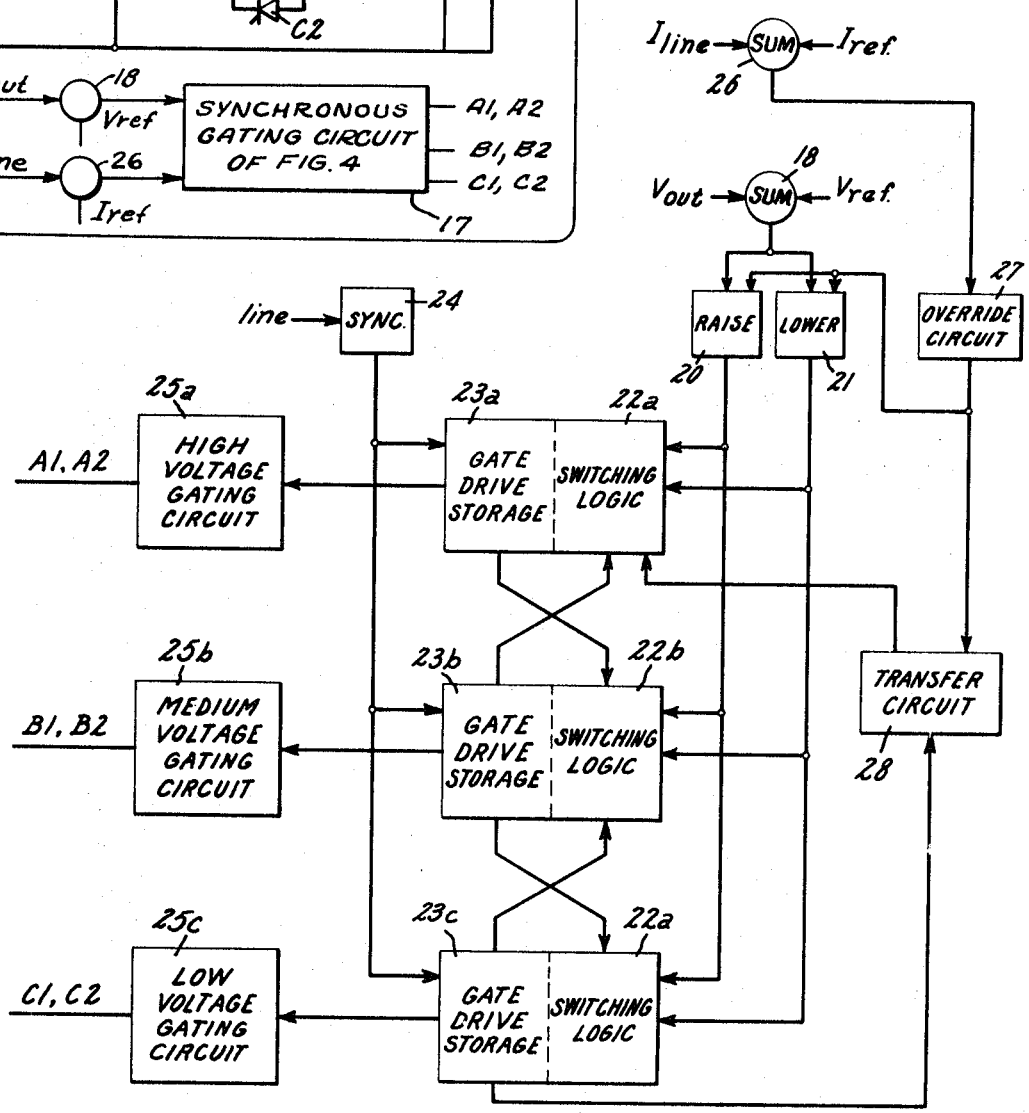

Inventors:
Leon J. Goldberg,
Francois D. Martzloff,
by
Their Attorney.

Inventors:
Leon J. Goldberg,
Francois D. Martzloff,
by *Ronald R. Campbell*
Their Attorney.

OVERCURRENT PROTECTION FOR SOLID-STATE VOLTAGE REGULATOR

This invention relates to solid-state voltage regulators provided with protection against overcurrents, and more particularly to a step voltage regulator employing solid state switches that are protected against overcurrents during the interval before a conventional electromechanical line circuit breaker opens.

A common form of solid-state voltage regulator comprises a shunt transformer winding having a plurality of taps along the winding each connected to an output terminal by a bidirectional conducting solid-state switch or a pair of inverse-parallel switches. By selectively rendering conductive the proper switch, the output voltage is maintained approximately constant despite changes in the line voltage. The present invention is disclosed with regard to a different type of solid-state voltage regulator in which positive or negative incremental voltage injections are made by means of one or more series transformers in the line excited by a shunt primary transformer winding. The solid-state switches are connected to different taps on the series transformer winding itself, or alternatively are connected to taps on a shunt secondary transformer winding to place a selected portion of the shunt secondary winding in series with the series transformer winding. In either case, the solid-state switches, typically a pair of inverse-parallel connected silicon-controlled rectifiers, are subject to overcurrents by the current transformer action of the series voltage injecting transformer winding whenever there is an excessively high current in the line caused, for instance, by a short circuit or an overload. Although the solid-state voltage regulator circuit breaker with its own sensor of excess current, such a circuit breaker usually requires about two or more complete cycles to achieve interruption of a 60-Hz. powerline. With ratings customarily permitting as much as 40 times normal current in a short circuit, this would impose a severe requirement on the solid-state switches. The overcurrent condition cannot be removed by turning off all the solid-state switches in the regulating circuit without developing an excessive voltage across each switch that would either destroy it or act to turn it on again. Therefore, if ordinary, lower cost, small solid-state switches are to be used in a step solid-state voltage regulator, protection from overcurrents is essential more quickly than would be obtained by the opening of a conventional circuit breaker in the line.

Fast circuit interruption can be achieved by means of a series thyristor placed in the line on the source side of the solid-state voltage regulator, The commutation circuit for the series thyristor acts quickly upon sensing an overcurrent to commutate off this type of line switch. Although fast current limiting action is achieved, there is the disadvantage of requiring a large thyristor switch with full line voltage and steady state current ratings. This type of overcurrent protection, then, is not fully satisfactory.

Accordingly, an object of the invention is to provide fast-acting and relatively inexpensive overcurrent protection for the solid-state switching devices of a solid-state voltage regulator.

Another object is an improved step solid-state voltage regulator incorporating an overcurrent protection circuit for the solid-state switching devices that is sufficiently fast acting that all or most of the switching devices need not have high current ratings.

In accordance with the invention, a solid-state voltage regulator comprises a shunt-exciting winding and at least one inductively coupled secondary winding having a plurality of spaced taps to which bidirectional conducting solid-state switching means are connected and controlled to synchronously inject selected voltage increments in series with the input voltage to regulate the output voltage. Some or all of the solid-state switching means comprise a low current rating device, or a pair of such devices, that are damaged by conducting overcurrents for a time period longer than a relatively short critical interval. The improvement which is made comprises the addition of fast-acting overcurrent protection means that is responsive to an overcurrent sensor to temporarily divert the overcurrent from the low-current-rating devices before damage occurs, i.e., within an interval shorter than the critical interval during which these devices can safely conduct the overcurrent.

In one embodiment of the invention, one of the solid-state switching means comprises a high-current-rating device or pair of devices, and the overcurrent is transferred to the high-current-rating device while at the same time inhibiting the low-current-rating devices from subsequently conducting. In the second and third embodiments all the devices are low-current-rating devices, but in one case the overcurrent is transferred from one to the other rapidly in sequence so that each conducts at any one time for a period less than the critical interval. In the other case, all the low-current-rating devices are shunted by a protective switch that provides a low impedance path for the overcurrent. As will be discussed, the protective switch can have several other functions.

The foregoing and other objects, features, and advantages of the invention will be apparent from the following more particular description of the several preferred embodiments of the invention, as illustrated in the accompanying drawings wherein:

FIG. 1 is a schematic circuit diagram of one form of the solid-state voltage regulator wherein overcurrent protection is obtained by using only one pair of high-current-rating solid-state switches while the remaining pairs of switches have lower current ratings;

FIG. 2 is a diagrammatic block diagram of a synchronous gating circuit for the FIG. 1 regulator provided with the feature of switching to the high-current-rating switches when an overcurrent occurs;

FIG. 3 is a modification of FIG. 1 using all low-current-rating solid-state switches and shows an overcurrent protection circuit in which the current is transferred from one pair of switches to another in rapid sequence;

FIG. 4 is similar to the synchronous gating circuit block diagram of FIG. 2 but illustrates modifications needed to transfer the current from one pair of switches to another rapidly for use with the FIG. 3 circuit;

Figure 5:
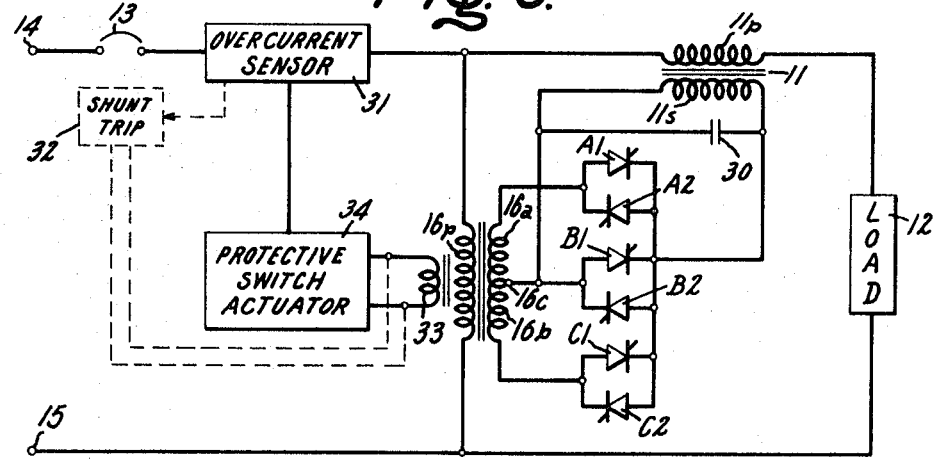
FIG. 5 is also similar to FIG. 1 and shows a third overcurrent protection mechanism in which the current is diverted by a protective switch to a low-impedance path around the pairs of switches.

The solid-state voltage regulator shown in FIG. 1 comprises a series regulator transformer 11 having a primary winding 11p connected in series circuit relationship with a load 12 and a conventional electromechanical line circuit breaker 13 across a pair of input terminals 14 and 15 that in turn are connected across a source of single phase alternating current potential. The invention will be explained with regard to the commonly available 60-Hz. source but is usable generally with other low frequency power sources. The series regulator transformer 11 injects positive or negative polarity voltage increments, or zero voltage increments, into the load circuit to maintain the load voltage approximately constant within a predetermined range of regulation despite variations in the line voltage applied to input terminals 14 and 15. In some equipment of this type of the voltage injections are employed to adjust the output voltage to a preselected magnitude. Energy for these injected voltage increments are derived in a shunt-exciting transformer having a primary exciting winding 16p connected between terminals 14' and 15. The secondary exciting winding is divided into two equal winding sections 16a and 16b by means of three bidirectional conducting solid-state switches, or pairs of inverse-parallel connected unidirectional conducting solid-state switches, connected respectively to the two ends of the secondary exciting winding and to a fixed center tap 16c. In the circuit illustrated, the tap changer solid-state switches are inverse-parallel pairs of silicon-controlled rectifiers identified as A1, A2; B1, B2; and C1, C2. Other power semiconductors such as a triac and the diac can be used in place of the pairs of silicon-controlled rectifiers. Both the triac and the diac are bidirectional-conducting bilateral thyristors, and the triac is similar to the silicon-controlled rectifier in that it has a gate electrode for initiating conduction, whereas the diac is a nongate-type device. To complete the one-state regulator, the secondary winding 11s of series regulator transformer 11 is connected between the center-tap point 16c of the secondary exciting winding and the common connected load terminals of the various solid-state switches.

In order to turn off the silicon controlled rectifier or other nongate turnoff thyristor power semiconductors, it is necessary to reduce the current through the device to a value below the holding value or to make the cathode of the device positive relative to the anode. The need for special commutation circuits in FIG. 1 is obviated by relying on the natural commutation provided by the passage of the alternating current through the natural current zero. A synchronous gating circuit 17 is provided to supply gating pulses to the appropriate pair of thyristors at the beginning of each current half cycle. Gating circuit 17 is controlled by the magnitude and polarity of the error voltage generated by comparing a predetermined reference voltage $V_{ref}$ and the instantaneous output voltage $V_{out}$ in a summing circuit 18. Assuming that the polarity of the line voltage is positive at input terminal 14 with respect to terminal 15, rendering conductive thyristor A1 for a half cycle of conduction places secondary exciting winding section 16a in series with series transformer secondary winding 11s, and applies an additive voltage increment in series with the line voltage to maintain the load voltage approximately constant. When $V_{ref}$ and $V_{out}$ are approximately the same, thyristor B1 is rendered conductive to apply a zero voltage increment correction. In the event that the output voltage is high, thyristor C1 is rendered conductive to place a negative polarity voltage increment in series with the line or input voltage by means of series transformer 11. Upon the change of polarity of the line voltage at the end of the half cycle, the same secondary exciting winding sections are connected to give the additive or subtractive voltage increments. In either case, winding section 16a is a "boost" winding whereas winding 16b is a "buck" winding. The magnitude of the voltage increments, of course, depends upon the turns ratio of the shunt-exciting transformer. The solid-state regulator in FIG. 1 has only one stage, but in practice there are commonly additional stages, each with a separate secondary exciting winding and the three solid-state switches or pairs of switches to inject digitally related values of voltage increments. Additional shunt-primary-exciting windings can be provided, or the shunt-exciting transformer can have multiple secondary windings. Other possible variations are that the tap points on the secondary exciting windings can be unsymmetrical as well as symmetrical, and the voltage increments generated by each secondary exciting winding can be of only one polarity by placing the zero voltage increment point at one end of the winding. A different form of the solid-state voltage regulator, in which the series transformer 11 is not used and the individual secondary exciting windings are placed directly in series with the load, will be discussed later with regard to FIGS. 8 and 9. Overcurrent protection as herein taught can be obtained with any of these forms of the solid-state voltage regulator. It is also usable with a configuration of a solid-state load tap changing transformer having similar stages that inject plus and minus voltage increments in series with the secondary winding of the main transformer.

The overcurrent protection provided by the conventional electromechanical line circuit breaker 13 is relatively slow acting, since this equipment commonly requires at least two to four complete cycles (assuming a frequency of 60 Hz.) to achieve interruption. In a more complex system the delay before opening is commonly much longer, as much as 1 or 2 seconds. In the event of an overcurrent caused by a short circuit or an overload, the solid-state switches in FIG. 1 are exposed to line current overloads by the current transformer action of series regulator transformer 11. Overcurrent protection for the solid-state switches is obtained according to a first embodiment of the invention by using only one pair of high-current-rating switches, such as C1 and C2, and switching to this pair at the next current zero after the overcurrent is detected. These large "heavy-duty" thyristors are capable of conducting the overcurrent until the conventional circuit breaker 13 opens. The remaining silicon-controlled rectifiers are ordinary, low-cost, lower current rated devices that are incapable of conducting such a high current continuously until the line circuit breaker opens. These lower cost devices are, however, capable of conducting a heavy current for a short time, less than a critical interval, typically less than 2 to 4 cycles of 60Hz. power. The current ratings of thyristors A1, A2, B1, and B2 are such that they would overheat and be destroyed or seriously damaged if subjected to the full value of the high overcurrent until circuit breaker 13 opens. The short time current overcapacity for a given thyristor is determined from the specifications published by the manufacturer. For the GE C35 thyristor, for example, it is determined from the curve "Maximum Allowable Nonrecurrent Peak Surge Forward Current at Rated Load Conditions," which is reprinted on page 35 of the SCR Manual (see also page 434).

FIG. 2 shows one possible gating circuit for the solid-state switches that implements this mode of action in the event of overcurrent, and can be considered to be a more detailed showing of synchronous gating circuit 17 in FIG. 1. This gating circuit operates on the basis that the solid-state switches are always operated on a step-by-step basis to change the load voltage from high to medium to low, or vice versa, depending upon whether series transformer 11 injects an additive voltage increment, a zero voltage increment, or a subtractive voltage increment. Depending upon whether the output voltage $V_{out}$ is less or more than the reference voltage $V_{ref}$ as determined by compare or summing circuit 18, a signal is directed to circuit 20 to raise the output voltage or to circuit 21 to lower the output voltage. The output voltage is sensed by potential transformer 19 (FIG. 1), and the polarity of the error voltage generated by summing circuit 18 determines whether circuit 20 or 21 is activated. The "raise" and "lower" signals are supplied to switching logic circuits 22a, 22b, and 22c , one for each inverse-parallel pair of solid-state switches. Associated with the respective switching logic circuits are gate drive storage circuits 23a—23c, each of which is synchronized with the line current by means of a synchronizing circuit 24. The structure of these switching logic circuits will be obvious to those skilled in the art from the description of the operation of FIG. 2 (and also FIG. 4) which follows, and can be implemented with digital circuitry of the type discussed in the Transistor Manual, 7th Edition, Copyright1964, published by the General Electric Company (see Chapters 5 and 7). The same statement applies in general to the other circuit elements shown in block form in FIGS. 2 and 4, which in general can be constructed as solid-state digital circuitry using prior art techniques. Upon command from its respective switching logic circuit at the current zero as determined by synchronizing circuit 24, a gating command is delivered to a high voltage gating circuit 25a, the medium voltage gating circuit 25b, or the low voltage gating circuit 25c (where high, medium, and low are referenced to the output of the voltage-injecting windings) which generate the actual gating signals for the respective thyristor pairs. Instead of supplying gating signals to both thyristors in a pair, the gating signal can alternatively be supplied only to that thyristor which would conduct according to the circuit conditions. Suitable gating circuits that can be employed are described for instance in the Silicon Controlled Rectifier Manual, 4th Edition, published by the Semiconductor Products Department, General Electric Company, Electronics Park, Syracuse, N.Y., copyright 1967. To implement the step-by-step sequencing, each switching logic circuit is interconnected with the next higher and/or lower gate drive storage circuit in the manner indicated by the arrowed lines. In operation, when gate drive storage circuit 23a supplies a signal to high voltage gating circuit 25a to gate thyristors A1 and A2, a signal is also supplied to switching logic circuit 22b. Upon receiving a signal from circuit 21 to lower the output voltage, the coincidence of the signals from circuits 23a and 21 causes switching logic circuit 22b to generate an output signal to gate drive storage circuit 23b. At the next current zero, medium voltage gating circuit 25b supplies a gating signal to thyristors B1 and B2 to result in lowering the output voltage. The operation is similar when the output voltage is to be raised.

Upon the occurrence of an overcurrent, the output voltage generally decreases and the normal operation of the gating circuit of FIG. 2 is to give a "raise" command and to energize the high voltage gating circuit 25a. Accordingly, an override circuit is needed in view of the previously described operation of the FIG. 1 circuit of switching to heavy-duty, high-current-rated thyristor pair C1 and C2 when an overcurrent occurs. Of course, in some circuits the high-current-rated pair of thyristors can be connected to the high voltage tap, i.e., thyristors A1 and A2 are the heavy-duty switches, and in this case an override is not needed. The line current $I_{line}$ sensed by current transformer 35 (FIG. 1) and a selected reference current $I_{ref}$ are compared in a summing or compare circuit 26, and an override circuit 27 is actuated when the line current exceeds the maximum allowable current. Override circuit 27 has an input to each of the switching logic circuits 22a—22c, and overrides the normal logic, and at the beginning of the next half cycle causes a gating signal to be supplied to low voltage gating circuit 25c and inhibits any gating signals that would be supplied to medium voltage gating circuit 25b or high voltage gating circuit 25a. Thus, the heavy overcurrent is immediately transferred at the next current zero to the high-current-capacity thyristors C1 and C2 (unless these switches were already conducting). For a 60-Hz. power supply, this always occurs within approximately 8 milliseconds or one half cycle. There is accordingly no damage to the ordinary, low-current-rating thyristors A1, A2 or B1, B2. Another possible gating sequence that can be implemented with the FIG. 4 gating circuit (not illustrated) is to have override circuit 27 direct circuit 21 to deliver a "lower" command to each of the switching logic circuits which causes a step-by-step sequencing from high to medium to low. If low voltage gating circuit 25c is already energized when the "lower" command is received, there is of course no sequencing and the function of override circuit 27 is simply to inhibit the normal gating sequence. This type of overcurrent protection is especially advantageous when there are multiple stages with a large range or regulation, since associating the high current devices with the lowest voltage tap reduces the overcurrent by a corresponding amount and gives more time for the circuit breaker to clear.

In a second embodiment of the invention illustrated in FIG. 3, all of the solid-state switches have the same relatively low current rating, and overcurrent protection is obtained by switching the overcurrent from one switch to the next in sequence rapidly after a half cycle or possibly a full cycle of conduction for each switch to take advantage of the short time current overcapacity of the devices. As was previously mentioned, the short time overcapacity of an ordinary power silicon-controlled rectifier in a power circuit is on the order of 2 to 4 cycles at a frequency of 60 Hz. In this way, the overcurrent is shared by all of the devices, or by a number of devices if all of the switches in a stage have not had the opportunity of sharing the overcurrent. Each individual solid-state switch preferably carries the overcurrent for only one half cycle. This may prove to be more economical than providing a single pair of high-current-capacity switches as in FIG. 1.

This mode of overcurrent protection requires a modification of the synchronous gating circuit as illustrated in FIG. 4. Override circuit 27 is modified by having connections to circuits 20 and 21 that respectively direct switching logic circuits 22a—22c to raise or lower the output voltage. In the event of an overcurrent situation the output voltage drops, and the normal operation of the synchronous gating circuit is that circuit 20 produces an output to direct the gating circuits to raise the output voltage. Accordingly, when summing circuit 26 produces an output indicative of the occurrence of an overcurrent, override circuit 27 inhibits circuit 20 from producing an output and causes circuit 21 to produce a consistent "lower" signal output. Assuming that the voltage regulator has only one stage with three switches or pairs of switches, the circuit now switches from the high voltage gating circuit 25a to the medium voltage gating circuit 25b and finally to the low voltage gating circuit 25c, the switch from one to the other preferably being made after a complete cycle so that each individual switch conducts only for a half cycle. Provision must be made, of course, to restart the high-medium-low gating sequence in the event that the overcurrent still persists or that the overcurrent occurred when the regulator circuit was producing a medium or low voltage output. For this purpose, gate drive storage circuit 23c has an output connected to a transfer circuit 28 which is actuated or energized by override circuit 27 and supplies an output signal to switching logic circuit 22a whenever these two inputs are present. The result is that the high-to-medium-to-low switching cycle is restarted. When the solid-state voltage regulator has a number of stages, a transfer circuit 28 is provided for each of the stages. Where there are a greater number of switches per stage, the load-sharing advantage is increased, since there is a longer time before the overcurrent returns to a given switch or pair of switches that is using the circular switching sequence.

A third embodiment of a solid-state voltage regulator provided with overcurrent protection is shown in FIG. 5. In this case overcurrent protection is provided by diverting the current in series transformer secondary winding 11s from the array of solid-state switches to a low impedance path. The low impedance path is provided by a protective switch 30 connected directly across series transformer secondary winding 11s, effectively in parallel circuit relationship with all the solid-state switches. Protective switch 30 is either a conventional electromechanical contactor, or is a pair of inverse-parallel thyristors or a single bidirectional-conducting thyristor. In the first approach using a conventional electromechanical contactor, it is desirable that the actuating coil drive be modified to speed up the closing, as for instance by a capacitor discharge producing a momentary high current in the coil. Since the overcurrent need be carried by protective switch 30 only for a short time duration until line breaker 13 opens, a relatively inexpensive low-current-rated contactor can be used. Overdrive of the armature produces contact closing in less than one cycle at a frequency of 60 Hz. In the second approach using a solid-state protective switch 30, bounce-free transfer of the overcurrent is achieved quickly in possibly only a few microseconds. The advantage of this type of protection circuit increases when there are a number of regulator stages, since only one or one pair of high-current-capacity thyristors need be provided for the entire regulator.

Figure 6:
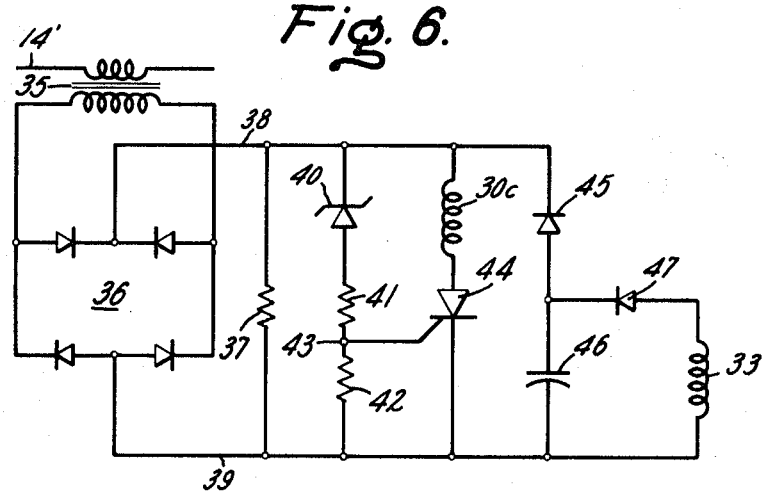
FIG. 6 is a detailed schematic circuit diagram of a specific form of electronic overcurrent sensor and protective switch actuator that can be used in the FIG. 5 circuit.

FIGS. 5 and 6 illustrate the actuation of protective switch 30 when a conventional electromechanical contactor is used. The current is sensed by a suitable overcurrent sensor 31 placed on the source side of the regulator in the line series with line circuit breaker 13. One form of actuator illustrated in dotted lines is electromagnetic, and comprises a shunt trip 32 turned on by the overcurrent sensor 31. Shunt trip 32 is energized by an additional low power secondary winding 33 magnetically coupled with primary exciting winding 16p, and includes a latch that closes when an overcurrent is sensed to release prestored actuating power for contacts 30. The preferred form, however, is that protective switch 30 is a simple magnetic contactor with a suitable low turn coil that is energized through electronic switching when an overcurrent is sensed. This is illustrated in block form in FIG. 5 as protective switch actuator circuit 34, and this circuit is also energized by low power secondary winding 33.

FIG. 6 shows one specific form that overcurrent sensor 31 and protective switch actuator circuit 34 can take. The overcurrent sensor includes a current transformer 35 having a primary winding connected in series in line 14'. The secondary winding of current transformer 35 is connected to a full-wave diode bridge rectifier 36 having a current-sensing resistor 37 connected across the DC output terminals 38 and 39. The line current provides a DC voltage across resistor 37 that is proportional to line current. This DC voltage is sensed by the series combination of a Zener diode 40 and voltage divider resistors 41 and 42 connected in series between terminals 38 and 39. Junction point 43 in the resistive voltage divider is connected to the gate of a silicon-controlled rectifier 44 which is rendered conductive when the voltage across resistor 42 exceeds a preselected value. SCR 44 is connected in series circuit relationship with a low turn actuating coil 30c for the mechanical contacts of protective switch 30. A blocking diode 45 and storage capacitor 46 are connected across coil 30c and SCR 44, with the further arrangement that capacitor 46 is precharged from low-power secondary winding 33 through rectifier 47. The turning on of SCR 44 discharges the stored energy in capacitor 46 through coil 30c, thereby closing the contacts of protective switch 30. By way of brief summary, this occurs when an overcurrent in line 14' acting through current transformer 35 produces a DC voltage across resistor 37 that exceeds a critical value. This DC voltage as sensed by the voltage across the resistor 42 renders conductive SCR 44, thereby rapidly discharging the prestored energy in capacitor 46 through actuating coil 30c in the manner previously described.

Figure 7:
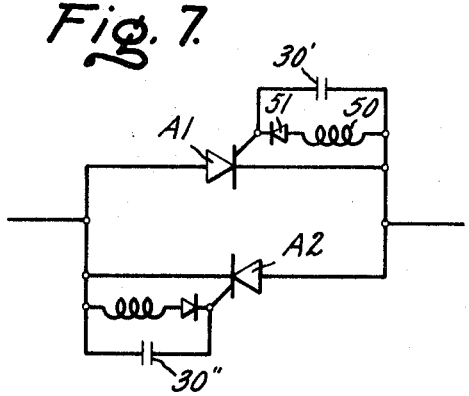
FIG. 7 is a schematic circuit diagram of a pair of inverse-parallel solid-state switches for use in a modification of the circuit of FIG. 5 in which a further degree of control is obtained.

Until this time, nothing has been said about what happens to the solid-state switches when protective switch 30 is closed to provide a low impedance path for the overcurrent. The solid-state switches may then either be left to turn off by removing the gating signals, or continue to be gated in the normal mode, or can be connected to the zero voltage or neutral tap 16c. A technique for implementing this additional control is shown in FIG. 7 for inverse-parallel connected thyristors A1 and A2. The usual gating circuit can comprise, for example, a pulse transformer 50 connected in series with a blocking diode 51 between the cathode and gate of the thyristor. The addition of auxiliary contacts 30' and 30'' between gate and cathode of the respective thyristors A1 and A2 permits the aforementioned operation to take place following the closing of the main contacts of protective switch 30. Auxiliary contacts 30' and 30'' are on protective switch 30 and are closed when the main contacts close, thereby shunting any subsequent gating signals and preventing further turn on of the thyristors. By providing all of the thyristor switches A1 and A2; B1 and B2; and C1 and C2 with these auxiliary contacts, all of the switches turn off following the closing of the protective switch. This is not especially desirable when protective switch 30 is an electromechanical contactor, because excessive voltages may occur should switch 30 open momentarily due to contact bounce. By providing none of the thyristor switches with the auxiliary contacts as illustrated in FIG. 7, the thyristors remain gated in the normal mode and this causes a tap change to occur toward the highest output voltage due to the drop of the load voltage. In this case there is circulating current in the closed loop comprising the closed switch 30 and thyristors A1 and A2. By providing only thyristors A1, A2, and C1. C2 with the auxiliary contacts as illustrated in FIG. 7, the solid-state switches are left connected to neutral tap 16c and there is no circulating current.

Figure 8:
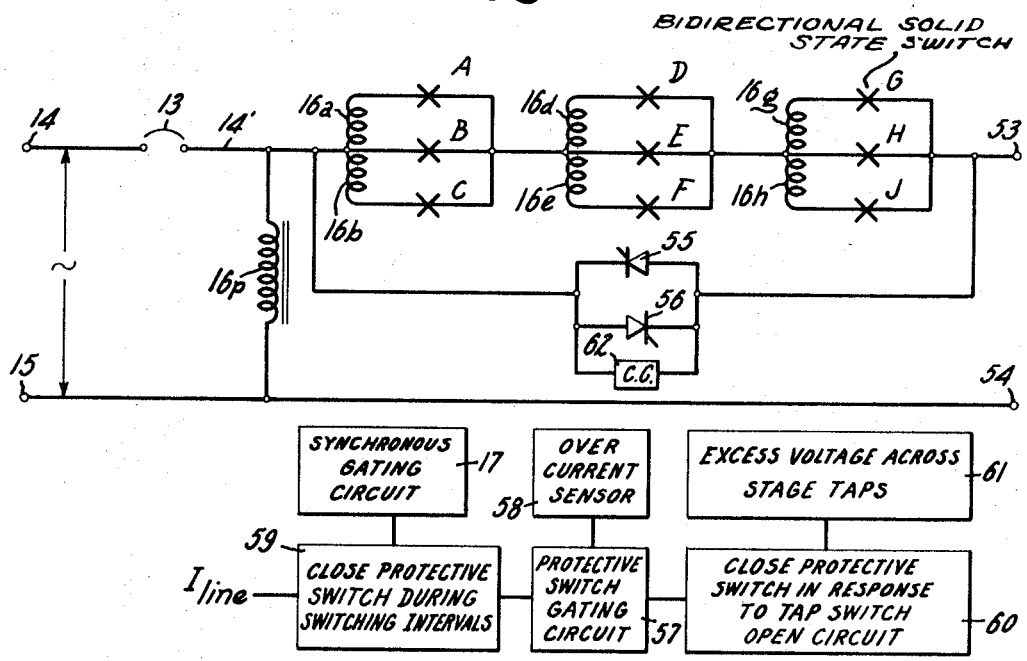
FIG. 8 is a detailed circuit diagram of a second form of the solid-state voltage regulator illustrating the use of a protective switch with this type of regulator.

FIG. 8 shows the other basic form of the solid-state voltage regulator in which the series transformer 11 is not used, and the voltage-injecting windings are placed directly in series with the load. FIG. 8 also illustrates a voltage regulator with three stages, each similar to the stage illustrated in FIG. 1 in that additive and subtractive voltage increments are possible as well as the zero voltage increment, and in that each stage has three taps connected to a bidirectional-conducting solid-state switch or a pair of inverse-parallel switches indicated here by the symbol X. The three pairs of voltage injecting windings 16a, 16b; 16d, 16e; and 16g, 16h all derive their energy from shunt-exciting winding 16p, and different values of total injected voltage are obtained by making the voltage spans of the stage windings different from one another. For example, the first stage produces (+1) (0) (−1) voltage increments, the second stage (+3) (0) (−3) voltages, and the third stage (+9) (0) (−9) voltages. Switches A—J, three per stage, are rendered conductive synchronously in the proper combination so that the output voltage appearing between output terminals 53 and 54 is substantially constant.

The use of a protective switch effectively connected in parallel with all of the switches to provide a low impedance path for overcurrent is also illustrated in FIG. 8 for this type of solid-state voltage regulator. Instead of using the electromechanical contactor 30, however, the protective switch takes the form of a high-current-rating pair of inverse-parallel connected silicon-controlled rectifiers 55 and 56 connected in parallel with all three of the regulator stages between terminal 14' and output terminal 53. A gating circuit 57 for the protective switches 55, 56 operates in essentially the same manner as described in regard to FIG. 5 in that gating signals are supplied to the protective switches by a suitable overcurrent sensor 58 whenever an overcurrent condition exists. High-current-capacity switches 55, 56 remain conducting until the opening of line circuit breaker 13. Gating circuit 57 and sensor 58 can take the same form as in FIGS. 5 and 6. In this embodiment of the invention, the protective switches 55, 56 are illustrated as being dual-purpose switches having other functions. The principle of synchronously switching selective windings in series with the line makes use of the ability of the solid-state switches, because of their speed, to open the line and reclose it with the changed circuitry in a relatively short interval of time near the natural zero of the line current such that the entire act effectively is accomplished when there would be no current in the line independent of this switching operation. The line circuit does, however, develop some voltage across the open switches. The rate at which this voltage is developed may be such that the voltage is not dangerous or damaging before the circuit is reclosed, and in those cases where the voltage does rise slightly more than desirable, this excess can be suppressed by the use of small capacitors. In general, the rate of voltage rise across the open switches depends upon many variable factors associated with the circuits' distributed parameters that depend on the mechanical configuration and on the magnitude of the line voltage to which the regulator is applied. In many instances, it is an economic burden to provide the regulator with adequate voltage-suppressing capacitors or with solid-state switches having voltage ratings large enough to take care of the voltage rise that occurs in the brief period in which the line circuit is open to accommodate the tap switching.

For this reason, protective switches 55, 56 can be controlled to provide the additional function of closing the line circuit during the tap-switching intervals. This is accomplished by always rendering conductive one of switches 55 or 56, depending upon the polarity of the line voltage, during each current zero interval, or at least during those current zero intervals when a tap change takes place. The overlap intervals just before and after a tap change are short, such as less than 10 microseconds. This interval is so short that the effects of zero voltage increment, caused by the closure of the protective switch, are negligible when the circuit in the steady state requires a different voltage increment. To implement this additional function, protective switch gating circuit 57 is also controlled by a suitable circuit 59 that closes the protective switch during the switching intervals. The function of circuit 59 can be provided, for example, by generating a gating pulse by the same or similar firing circuitry that provides for the tap change in synchronous gating circuit 17. Switch 55 or 56, depending on which is rendered conductive, is line commutated off by the change in polarity of the line voltage or by the voltage of the incoming tap. A special commutation circuit 62 is needed to turn off the protective switches when the voltage injections are negative.

Still another function of protective switches 55, 56 is to shunt a solid-state tap switch in the event of a tap switch failure in the open circuit mode. The line voltage can cause highly destructive arcing at an open-circuited solid-state switch. Protective switch gating circuit 57 to this end is also controlled by a suitable circuit 60 that commands closure of the protective switch in response to a tap switch open circuit. Circuit 60 is actuated, for example, by a sensor 61 that senses the excess voltage across the two pairs of taps in each stage and supplies a signal to circuit 61 when this voltage exceeds a critical voltage in excess of the normal but within the rated capabilities of the switches. Although not here illustrated, this same excess voltage signal is also used to alarm and shut down the equipment since it represents an abnormal or emergency condition. The shutdown of the equipment inherently provides the commutation of the protective switch when rendered conductive in this manner.

Still another function of protective switches 55, 56 in addition to providing overcurrent protection, is to minimize the number of switches required to obtain a specified span of voltage adjustment in uniform steps of specified magnitude with as few switches and as little complication of the windings as possible. In order to understand the background of this, before proceeding to FIG. 9, the system for obtaining the minimum number of switches will be described first. The stages of such a regulator with minimum switches are like those discussed previous to this point, that is, each stage has a section that is of positive polarity with respect to a circuit connection point and a winding section that is of negative polarity with respect to that point. There are three bidirectional switches per stage to insert the stage sections in series with the load in any desired combination of positive or negative or zero polarity voltage of the individual sections. The sizing of the voltage spans of the stages is so selected to make available the maximum number of unit steps of voltage with the minimum number of switches, it being understood that for any number of unit steps of voltage available, it is also possible to obtain any whole number of units less than the maximum.

Let the letters $(a), (b),....(n)$ represent the number of stages and $V^+_n$, $V^1_n$ the positive and negative maximum voltage through the $n$th stage, expressed in units of voltage. The unit, e.g., 1 percent, becomes the individual step of voltage that the regulator can switch. To get the maximum number of steps of regulation with the minimum number of switches, symmetrical stages are used in which $$V_n^{\pm} = 2\Sigma(V_a^{\pm} \ldots + V_{n-1}^{\pm}) + 1$$

and the voltage span of regulation, in unit steps is
$$\pm\Sigma(V_a \ldots + V_n)$$
This is illustrated in the following table:

| | Stages | | | | |
|---|---|---|---|---|---|
| | (a) | (b) | (c) | (d) | (e) |
| ±voltage (units) of the stage | 1 | 3 | 9 | 27 | 81 |
| ±voltage of regulator consisting of stages (a) through (n) | 1 | 4 | 13 | 40 | 121 |

Thus, if a unit voltage were 1 percent, a three-stage regulator could regulate to ±13 percent in 1-percent stages, a four-stage regulator to ±40 percent, and a five-stage regulator, to ±121 percent. In the five-stage regulator, the span from −100 percent to −121 percent would not be generally useful. It is not necessary to utilize the maximum capability of the last stage and if the last stage is built to less than the maximum range shown in the table, the regulator span is reduced accordingly. In some cases, the number of switches is not changed but the voltage capability of the section winding is reduced, resulting in some economy in construction of the winding and in voltage capability of the switch. Where the restricted range is of suitable size, one less switch can be employed in the last stage, as for instance, by omitting one polarity in the last stage. As an extension of these principles, the economical relation between switches and regulation range can be maintained if the voltages in each stage are not symmetrical provided the voltage span is unchanged.

Figure 9:
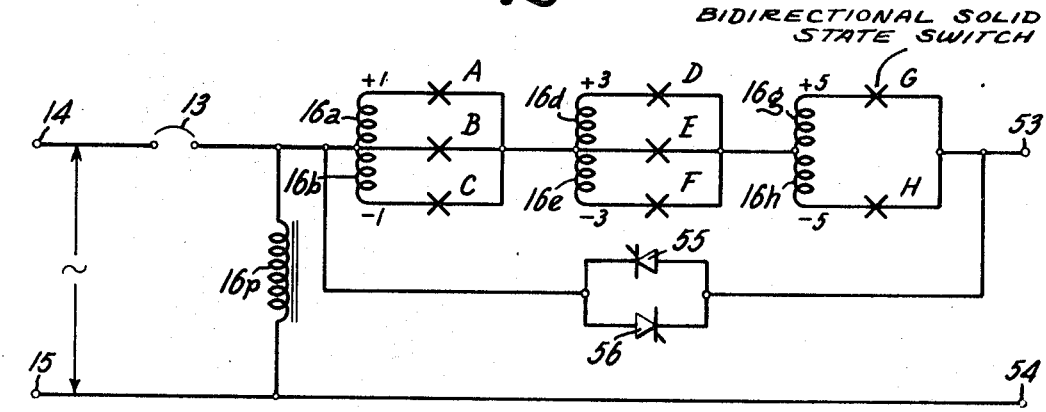
FIG. 9 shows a modification of FIG. 8 in a circuit that uses the protective switch for other functions.

FIG. 9 illustrates a somewhat different principle of omitting one switch in the last stage as applied to a symmetrical regulator in which the voltage of the last stage, for each polarity, is just equal to the maximum voltage possible from the preceding stages together. This arrangement further demonstrates another aspect of the dual function of protective switches 55, 56. In FIG. 9, a two-stage regulator has a range of ±4 as shown in the table. Thus, stage (a) has the voltage tap selections of (+1)0(−1), and stage (b) has the voltage tap selections of (+3) (0) (−3). Various combinations of these voltage tap selections give the range of +4 to −4. By adding a third stage (c) with the voltage tap selections (+4) (−4), the switch to center tap is omitted, and the combined three stages regulate in the range of +8 to −8 using only eight switches. The zero increment of voltage for this arrangement is obtained with the third stage operating in either the positive or negative polarity, providing the preceding stages are switched to the polarities that match. When protective switches 55, 56 are added to this arrangement, there are eight switches in the regulator to obtain ±8 uniform steps of voltage switching plus the zero voltage increment. A modification of this scheme is to made the voltage tap selection in stage (c) equal to +5 and −5, instead of +4 and −4. The higher value of the last stage extends the regulation range by one unit in either polarity, i.e., ±9 uniform steps but voids the possibility of connecting the full group of stages to result in the zero voltage increment. By using protective switches 55, 56 to obtain the zero voltage increment, the full range of regulation is restored. Protective switches 55, 56 thus have the dual function in this arrangement of generating one voltage step as well as overcurrent protection. In this manner, the regulator range is ±9 uniform steps using only eight tap-changing switches. Thus, by changing the voltage step selection of final stage (c) to ±5 rather than ±4, and using protective switches 55, 56 to generate the zero voltage increment, an additional step of regulation is obtained without increasing the number of switches.

In summary, in a solid-state voltage regulator constructed with all or almost all relatively inexpensive low-current-rating solid-state devices, overcurrents caused by short circuits or overload can be diverted from the array of solid-state switches to a low impedance path by a specially provided protection switch, or can be diverted to one switch or pair of switches that are selected to have higher current ratings than the others, or is switched from one switch or pair of switches to another in sequence in order to time share the overload and thus take advantage of the short time current overcapacity of the devices. In addition to overcurrent protection, the special protection switch is optionally capable of other functions, in particular to shunt the switches during the tap-changing interval, to protect the equipment in the event of the open circuit failure of a switch, and to generate a voltage step and minimize the number of switches required to obtain a given number of voltage steps. The invention is applicable as well to a tap-changing transformer having one or more voltage-injecting stages.

While the invention has been particularly shown and described with reference to several preferred embodiments thereof, it will be understood by those skilled in the art that the foregoing and other changes in form and details may be made therein within the spirit and scope of the invention.

What we claim as new and desire to secure by Letters Patent of the United States is:

1. In a solid-state voltage regulator connected between input and output terminals and including at least one voltage-injecting transformer winding stage having a shunt-exciting winding and an inductively coupled secondary winding, a plurality of bidirectional conducting solid-state switching means each connected to spaced taps on said secondary winding, and a synchronous gating circuit for controlling said solid-state switching means to inject selected voltage increments in series with the input voltage to regulate the output voltage, wherein at least some of said solid-state switching means are low-current-rating devices that are damaged by conducting overcurrents for a time period longer than a relatively short critical interval, the improvement which comprises overcurrent sensing means, and fast-acting overcurrent protection means responsive to said overcurrent sensing means for temporarily diverting the overcurrent from said low-current-rating devices within an interval shorter than the critical interval during which overcurrents can be conducted without damage, wherein one of said solid-state switching means comprises at least one high-current-rating device capable of conducting the overcurrent for a substantial period of time, and said overcurrent protection means includes means for modifying the action of said synchronous gating circuit to synchronously render conductive said high-current-rating device to conduct the overcurrent while simultaneously inhibiting the gating of said low-current-rating devices.

2. A circuit according to claim 1 wherein said high-current-rating device that conducts the overcurrent is connected to the tap on said secondary winding that results in the lowest output voltage.

3. In a solid-state voltage regulator connected between input and output terminals and including at least one voltage-injecting transformer winding stage having a shunt-exciting winding and an inductively coupled secondary winding, a plurality of bidirectional conducting solid-state switching means each connected to spaced taps on said secondary winding, and a synchronous gating circuit for controlling said solid-state switching means to inject selected voltage increments in series with the input voltage to regulate the output voltage, wherein at least some of said solid-state switching means are low-current-rating devices that are damaged by conducting overcurrents for a time period longer than a relatively short critical interval, the improvement which comprises overcurrent sensing means, and fast-acting overcurrent protection means responsive to said overcurrent-sensing means for temporarily diverting the overcurrent from said low-current-rating devices within an interval shorter than the critical interval during which overcurrents can be conducted without damage, wherein all of said solid-state switching means comprise low-current-rating devices, and said overcurrent protection means includes means for synchronously rendering conductive said low-current-rating devices in sequence to transfer the overcurrent from one to the other after an interval of conduction shorter than the critical interval to take advantage of the short time current overcapacity of the devices.

4. In a solid-state voltage regulator connected between input and output terminals and including at least one voltage-injecting transformer winding stage having a shunt-exciting winding and an inductively coupled secondary winding, a plurality of bidirectional-conducting solid-state switching means each connected to spaced taps on said secondary winding, and a synchronous gating circuit for controlling said solid-state switching means inject selected voltage increments in series with input voltage to regulate the output voltage, wherein at least some of said solid-state switching means are low-current-rating devices that are damaged by conducting overcurrents for a time period longer than a relatively short critical interval, the improvement which comprises overcurrent-sensing means, and fast-acting overcurrent protection means responsive to said overcurrent sensing means for temporarily diverting the overcurrent from said low-current-rating devices within an interval shorter than the critical interval during which overcurrents can be conducted without damage, wherein all of said solid-atate switching means comprise low-current-rating devices, and said overcurrent protection means includes means for modifying the action of said synchronous gating circuit to synchronously render conductive said low-current-rating devices in a continuing sequence to transfer the overcurrent from one to the other after an interval of conduction shorter than the critical interval to take advantage of the short time current overcapacity of the devices.

5. In a solid-state voltage regulator connected between input and output terminals and including at least one voltage-injecting transformer winding stage having a shunt-exciting winding and an inductively coupled secondary winding, a plurality of bidirectional-conducting solid-state switching means each connected to spaced taps on said secondary winding, and a synchronous gating circuit for controlling said solid-state switching means to inject selected voltage increments in series with the input voltage to regulate the output voltage, wherein all of said solid-state switching means comprise low-current-rating devices that are damaged by conducting overcurrents of a predetermined magnitude for longer than a relatively short critical interval, the improvement which comprises overcurrent-sensing means, and fast-acting overcurrent protection means comprising a protective switch effectively connected in parallel circuit relationship with all of said solid-state switching means to divert the overcurrent from said low-current-rating devices to a low impedance path within the critical time interval, and an actuating circuit responsive to said overcurrent-sensing means for rendering conductive said protective switch upon the occurrence of an overcurrent, wherein said protective switch is an electromechanical contactor actuated by an associated coil, and said overcurrent-sensing means and actuating circuit includes an electronic circuit having a precharged capacitor that is discharged through the coil to close said contactor rapidly after the sensing of an overcurrent.

6. A circuit according to claim 5 wherein one of said taps on said secondary winding is a neutral tap, and said protective switch is connected directly to said neutral tap and to a common connection between all of said solid-state switching means, to prevent circulating current through the closed protective switch.

7. In a solid-state voltage regulator connected between input and output terminals and including at least one voltage-injecting transformer winding stage having a shunt-exciting winding and an inductively coupled secondary winding, a plurality of bidirectional-conducting solid-state switching means each connected to spaced taps on said secondary winding, and a synchronous gating circuit for controlling said solid-state switching means to inject selected voltage increments in series with the input voltage to regulate the output voltage, wherein all of said solid-state switching means comprise low-current-rating devices that are damaged by conducting overcurrents of a predetermined magnitude for longer than a relatively short critical interval, the improvement which comprises overcurrent-sensing means, and fast-acting overcurrent protection means comprising a protective switch effectively connected in parallel circuit relationship will all of said solid-state switching means to divert the overcurrent from said low-current-rating devices to a low impedance path within the critical time interval, and an actuating circuit responsive to said overcurrent-sensing means for rendering conductive said protective switch upon the occurrence of an overcurrent, further including means for additionally rendering conductive said protective switch during the switching intervals of said solid-state switching means, whereby said protective switch has a dual function.

8. In a solid-state voltage regulator connected between input and output terminals and including at least one voltage-injecting transformer winding stage having a shunt-exciting winding and an inductively coupled secondary winding with three spaced taps, bidirectional-conducting solid-state switching means connected to each of said taps to produce a high, medium, and low stage output voltage, and a synchronous gating circuit for controlling said solid-state switching means to inject a selected voltage increment in series with the input voltage to regulate the output voltage, wherein all of said solid-state switching means are low-current-rating devices that are damaged by conducting overcurrents for a time period longer than a relatively short critical interval, the improvement which comprises overcurrent-sensing means, and fast-acting overcurrent-sensing means, and operative during a portion of the interval before the opening of a conventional slow-acting circuit breaker connected in series with an input terminal, for switching the overcurrent from each low-current-rating device before damage occurs, wherein said overcurrent protection means includes means for continuously rendering conductive said low-current-rating devices in the sequence to produce high, medium, and low stage output voltages, each device conducting at any one time for an interval shorter than the critical interval during which the device safely passes overcurrents.

9. In a solid-state voltage regulator connected between input and output terminals and including at least one voltage-injecting transformer winding stage having a shunt-exciting winding and an inductively coupled secondary winding with three spaced taps, bidirectional-conducting solid-state switching means connected to each of said taps to produce a high, medium, and low stage output voltage, and a synchronous gating circuit for controlling said solid-state switching means to inject a selected voltage increment in series with the input voltage to regulate the output voltage, wherein all of said solid-state switching means are low-current-rating devices that are damaged by conducting overcurrents for a time period longer than a relatively short critical interval, the improvement which comprises overcurrent-sensing means, and fast-acting overcurrent protection means responsive to said overcurrent-sensing means, and operative during a portion of the interval before the opening of a conventional slow-acting circuit breaker connected in series with an input terminal, for switching the overcurrent from each low-current-rating device before damage occurs, wherein said overcurrent protection means comprises a protective switch connected in parallel circuit relationship will all of said low-current-rating devices, and means for rendering conductive said protective switch upon the sensing of an overcurrent, and wherein there are a plurality of voltage injection transformer winding stages each producing a plurality of selected voltage injection increments, and means for synchronously rendering conductive said protective switch to produce a zero voltage injection increment, whereby the protective switch has a dual function.